UNITED STATES PATENT OFFICE.

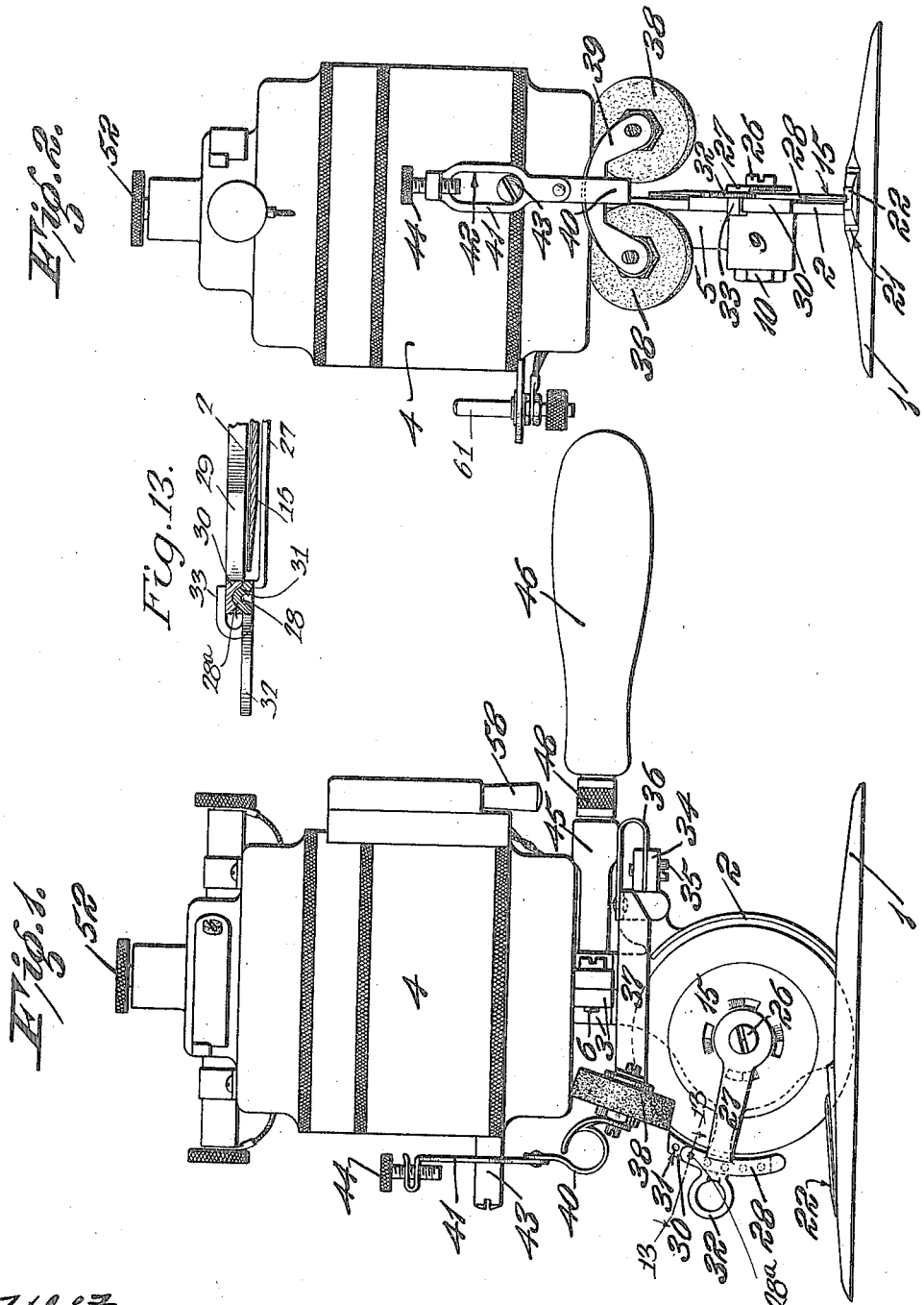

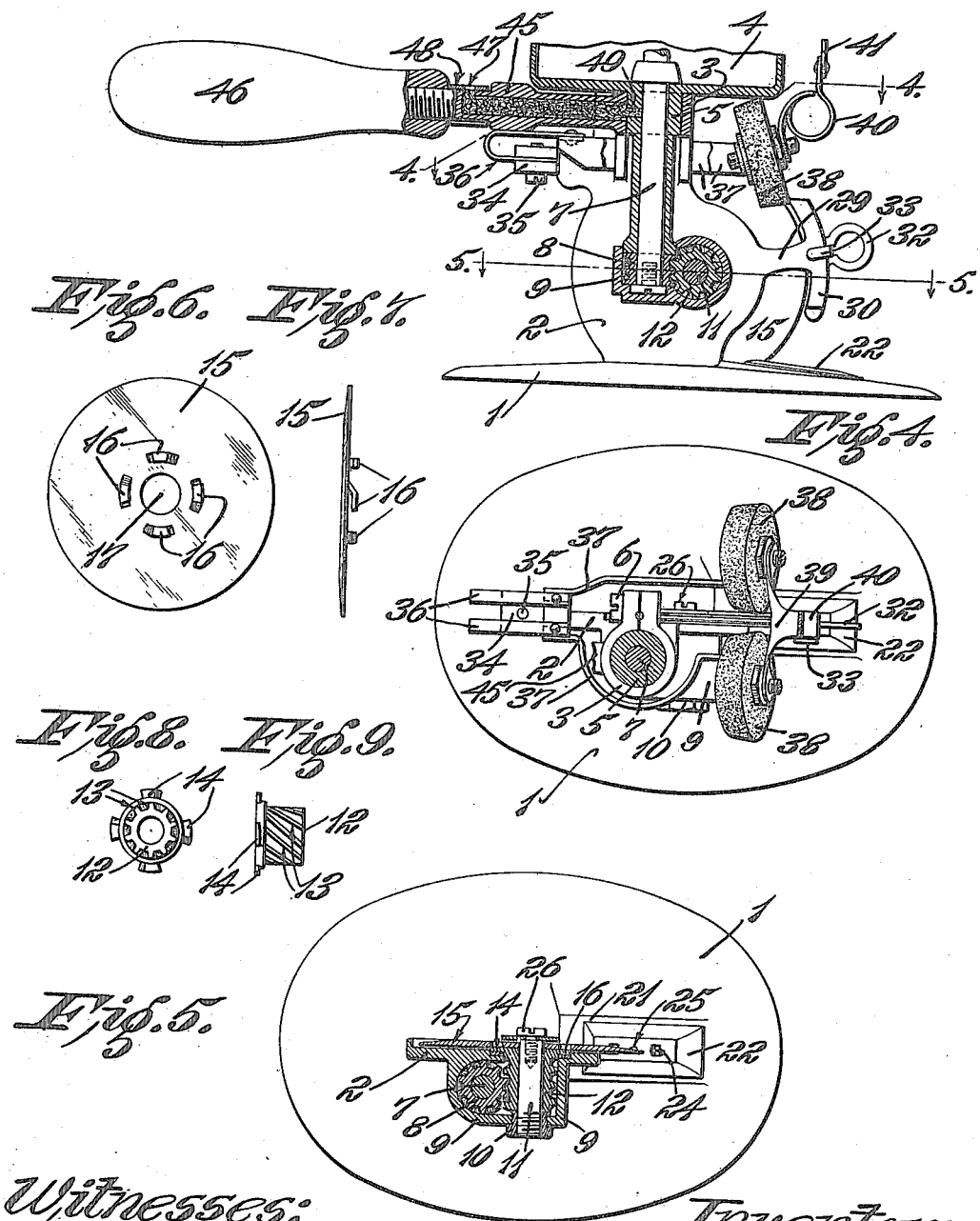

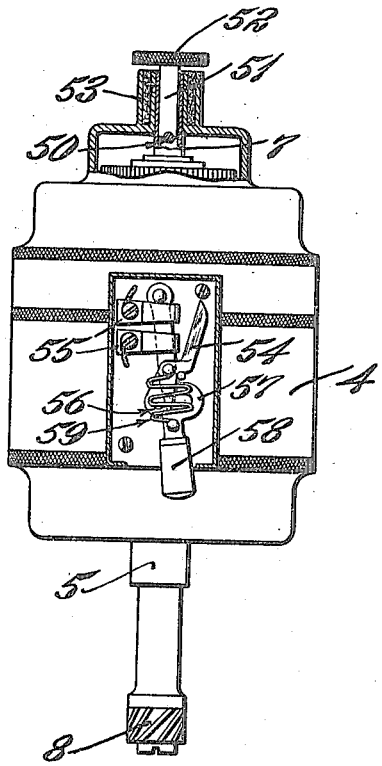
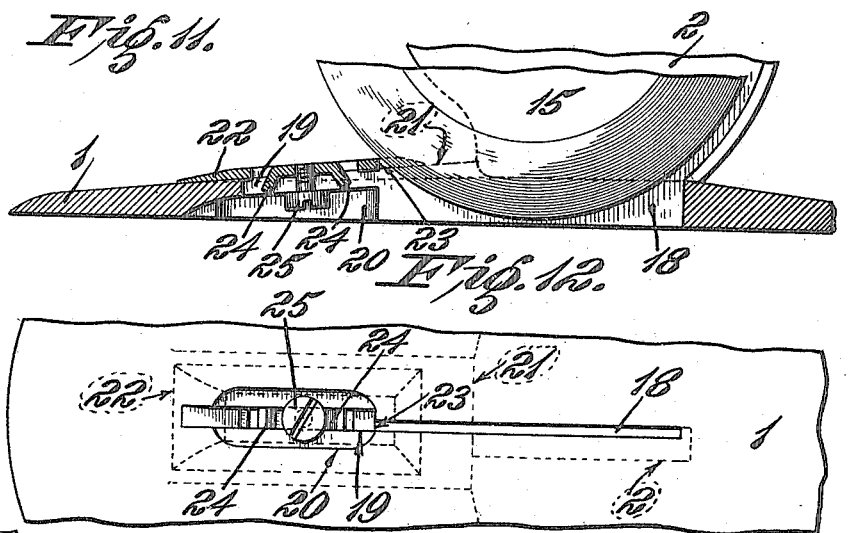

JOHN B. GURY, OF ST. LOUIS, MISSOURI.

CLOTH-CUTTING MACHINE.

1,136,126.         Specification of Letters Patent.       Patented Apr. 20, 1915.

Application filed June 8, 1914. Serial No. 843,656.

*To all whom it may concern:*

Be it known that I, JOHN B. GURY, a citizen of the United States, and a resident of the city of St. Louis and State of Missouri, have invented a new and useful Improvement in Cloth-Cutting Machines, of which the following is a specification.

My invention relates to cloth cutting machines designed for use in cutting a pile of cloth spread upon a table, and particularly to that type in which a rotary cutter, driven by an electric motor, is mounted on a foot plate to be freely movable over the table supporting the cloth.

One of the principal objects of my invention is to provide a device for connecting the cutter to the spindle upon which it is mounted which will efficiently transmit the driving force of the spindle to the cutter and which will permit the cutter being easily detached from its spindle.

A further object is to improve the construction of the guard which prevents the cutter from injuring the operator's hand.

A still further object is to simplify the construction of the support for the grinding wheels.

A still further object is to provide a throat plate for the cutter which can be adjusted as the cutter wears smaller to guide the cloth against the cutter at the same distance above the lower edge of the cutter.

In the accompanying drawings, which form part of this specification, and in which like reference characters refer to like parts throughout the several views,—Figure 1 is a side elevation of a cloth cutting machine embodying my invention; Fig. 2 is an end elevation of the machine shown in Fig. 1; Fig. 3 is a vertical section through the lower part of the machine shown in Fig. 1; Fig. 4 is a horizontal section on the line 4—4 on Fig. 3; Fig. 5 is a horizontal section on the line 5—5 on Fig. 3; Fig. 6 is a rear face view of the cutter; Fig. 7 is an edge view of the cutter; Fig. 8 is an end view of the cutter spindle; Fig. 9 is a side view of the cutter spindle; Fig. 10 is a rear elevation of the motor casing, with the cover plate of the switch removed and the upper bearing of the motor in vertical section; Fig. 11 is a fragmentary vertical section through the foot plate in the plane of the cutter; Fig. 12 is a fragmentary bottom plan view of the foot plate; Fig. 13 is an enlarged fragmentary detail section on the line 13—13 in Fig. 1.

The cutting machine shown in the accompanying drawings comprises a foot plate 1, which is preferably elliptical. The bottom face of the foot plate 1 is smooth and flat and its edge is thin so that the foot plate can easily slip under a pile of cloth spread upon a table. Secured to the foot plate 1 is an upright standard 2 which has integral therewith near the top a split sleeve 3. The motor for driving the cutter is mounted vertically in a motor casing 4. Since the construction of the motor does not form part of the invention, a detailed description of it will not be given. Extending downwardly from the motor casing 4 is a long bearing 5 which passes through the split sleeve 3 and which sleeve is clamped thereto by a screw 6. The motor shaft 7 extends down through the bearing 5 and to the end of the motor shaft 7 is secured a spiral gear 8.

Integral with the standard 2 is a gear case 9. Secured in the outer face of the gear case is a bushing 10 in which is fixed a pin 11. The pin 11 extends horizontally through the gear case 9 at one side of the motor shaft 7 to the opposite side of the standard 2. Rotatably mounted upon the pin 11 is a hollow cutter spindle 12, upon which are cut spiral gear teeth 13. Extending radially from the outer end of the cutter spindle are four equally spaced lugs 14. The edges of the lugs 14 which face in the direction in which the cutter spindle 12 rotates are beveled, as shown in Figs. 8 and 9.

The cutter 15 is a disk, the circumferential edge portion of which is beveled on one face to give a sharp periphery. Arranged in the circumference of a circle having the same center as the cutter 15 are four hooked fingers 16 which are secured to the cutter and which are spaced at equal distances around the circumference of said circle. The hooked fingers 16 are located the same distance from the center of the cutter 15 as the lugs 14 are from the center of the cutter spindle 12. The lugs 14 pass between the hooked fingers 16 and the cutter 15. The hooked fingers 16 join to the cutter 15 at their ends which face in the direction in which the cutter turns; and consequently, the lugs 14, by engaging the bottoms of the hooked fingers 16, will drive the cutter 15.

The hooked fingers 16 are preferably stamped from the cutter 15. In the cutter 15 is a circular hole 17 having the same diameter as the pin 11.

In the foot plate 1 is a longitudinal slot 18 in which the lower portion of the cutter 15 turns. Located in the front of the slot 18 and extending in the same line therewith is a guide slot 19. In the bottom of the foot plate 1 is a recess 20 extending on each side of the guide slot 19. The top face of the foot plate 1 has a flat rectangular portion 21 which inclines upwardly toward the cutter 15 and overlies the guide slot 19. Mounted on this inclined portion 21 of the foot plate 1 is a throat plate or cloth guide 22 which is a rectangular plate beveled along its marginal portions and has a slot 23 in one end through which the edge portion of the cutter passes. Arranged longitudinally of the throat plate 22 are two lugs 24, preferably pressed from said throat plate, which project downwardly into the guide slot 19. A screw 25 projects from the bottom of the foot plate 1 through the guide slot 19 and screws into the throat plate 22, the head of the screw 25 engaging the bottom of the recess 20.

Pivoted upon a screw 26 which screws into the outer end of the pin 11 in the gear case 9, is an arm 27 which extends across the outer face of the cutter 15. The arm 27 terminates in a curved guard 28 which is located close in front of the front edge of the cutter 15. Extending forwardly and slightly upwardly from the standard 2 is a bracket 29 which has at its outer end a curved head 30, against the face of which bears the guard 28. In the curved head 30 of the bracket 29 is a row of recesses 31, and the guard 28 is indented near the upper end thereof to form a projection 28ª (see Fig. 13) adapted to engage any one of said recesses 31. Integral with the guard 28 is a finger piece 32, and a hook 33 which engages the opposite side of the head 30 of the bracket 29. The arm 27 is resilient and presses the guard 28 against the head 30 of the bracket 29.

The grinder is supported by a bracket 34 integral with the standard 2. The bracket 34 is split at one end, and in this split end are clamped two flat springs 36 by means of a screw 35. Riveted to the free ends of the two springs 36 are two arms 37 which extend forwardly on opposite sides of the split sleeve 3 upon the standard 2. A grinding wheel 38 is mounted to rotate on the free end of each arm 37. The grinding wheels 37 lie in a plane perpendicular to the plane of the cutter 15. To the grinding wheels is loosely secured a yoke 39 which has an integral finger piece 40. Pivoted to the top of the yoke 39 is a link 41 having an elongated slot 42 therein, through which passes a stud 43 fixed to the motor casing 4. The upper end portion of the link 41 is bent transversely at right angles and rebent, and in the bent portion and the rebent portion of the said end portion of the link 41 is screwed an adjusting screw 44. The adjusting screw 44 is adapted to engage the stud 43 to limit the downward movement of the grinding wheels 38.

Integral with the split sleeve 3 is a hollow shank 45, to the end of which is fastened a handle 46. Communicating with the hollow in the shank is a hole 47 in the top of the shank; and around the shank 45, adjacent to this hole 47, is a split loose sleeve 48, having a hole therein adapted to aline with the hole 47 in the shank 45. In the bearing 5 of the motor casing 4 is a passage 49 communicating with the hollow in the shank 45. The hollow in the shank is filled with an absorbent material, such as felt, or the like.

At the top of the motor, the motor shaft 7 is hollow and has a pin 50 extending through it. A round rod 51, having a notch in its lower end face adapted to engage the pin 50, is inserted in the motor shaft 7. The rod 51 has a knurled head 52 at its top so that it can be easily turned. In the upper bearing for the motor shaft 7 is an annular recess 53, filled with felt or a like material; and in the inner wall of the upper bearing of the motor shaft 7 is a hole through which oil contained in the annular recess 53 can pass.

The switch for starting and stopping the motor is fastened to the rear of the motor casing 4 above the handle 46 in a position where the operator can easily operate the switch with his thumb. The switch comprises a blade 54 adapted to engage two spring contacts 55. The blade 54 is pivoted on a fixed pivot 56 located below the spring contacts 55. A switch lever 57, having an operating handle 58, is pivoted at a point above the contacts 55 and has a curved offset near the middle. A tension spring 59 is connected to the blade 54 at one end, and at the other end to the switch lever 57 below the pivot of the blade 54. A stop pin 60 limits the movement of the blade 54 away from the contacts 55.

An electrical current is supplied to the motor through the switch by flexible wires which are connected to a plug (not shown) which is adapted to slip over two pins 61 secured to the motor casing 4 and electrically connected to the motor, one of the pins 61 being shown in Fig. 2.

Referring to the operation of the device, the operator pushes the handle 58 of the switch (Fig. 10) to the left to start the motor. When the handle 58 of the switch has been pushed to the left to a point, where the line between the points where the spring 59 is connected to the blade 54 of the switch and to the switch lever 57, is at the left of the pivot 56 of the blade 54, the spring 59 then throws the blade 54 to the left into engagement with the two spring contacts 55. As the motor revolves, the spiral gear 8 secured to the motor shaft 7 drives the cutter spindle 12. The cutter spindle 12 drives the cutter 15 in the direction indicated by the arrow on Fig. 1. The foot plate 1 is now slipped under the pile of cloth and the machine moved along the table to cut the cloth along any desired lines.

In using the cutting machine, the operator usually holds the cloth before the cutter smooth with his hand. Under such conditions, the hand of the operator is liable to be accidentally cut; and to prevent this, the guard 28 is provided. The guard 28 is made adjustable so that it may be raised or lowered to stand in front of that part of the edge of the cutter 15 which is above the pile of cloth, regardless of the thickness of the pile of cloth. The guard 28 is adjusted by taking hold of the finger piece 32 and pulling said guard away from the curved head 30 of the bracket 29 against the opposition of the resilient arm 27. By this movement, the projection 28$^a$ on the guard 28 is withdrawn from the recess 31 in the curved head 30 in which it is engaged, and the arm 27, together with the guard 28 integral therewith, can be swung up or down on the screw 26 to the new position desired. When the guard 28 has been placed in the desired position, the pull upon the finger piece 32 is released and the guard 28 shifted until the projection 28$^a$ thereon engages the adjacent recess in the curved head 30, after which said guard is fixed in its new position. The hook 33 on the guard 28 prevents said guard from being pulled too far from the curved head 30.

The cutters in cloth cutting machines soon become dull and must be frequently sharpened. This sharpening of the cutter is easily accomplished in the machine shown and described without detaching the cutter. To sharpen the cutter 15, the motor is started, and while it is running, the operator swings the arms 37 downwardly and sidewise by means of the finger piece 40 to bring one of the grinding wheels 38 into engagement with the beveled edge portion of the cutter 15. The line of contact of the grinding wheel 38 with the beveled edge portion of the cutter 15 is at an angle to a radius of the cutter drawn to said line of contact and consequently the grinding wheel rubs the cutter as it revolves. When the beveled edge portion of the cutter 15 has been ground sufficiently, the arms 37 are swung sidewise in the opposite direction to bring the other grinding wheel 38 into contact with the opposite face of the cutter so as to remove the bur formed by grinding of the beveled edge portion of the cutter. The springs 38 permit the arms 37 to move both sidewise and downwardly, and also operate to return the arms 37 to their normal position. The adjusting screw 44 permits the extent of downward movement of the arms 37 to be adjusted as the cutter wears smaller.

The cutters of a cloth cutting machine are soon worn out by the frequent grinding to which they are subjected and it is necessary to make a supply of extra cutters for each machine. Since the cutters must be frequently replaced, it is desirable that it should be a simple operation to remove a worn cutter and put a new one in its place.

The cutter 15 may be easily removed by first removing the screw 26 and the arm 27, together with the guard 28. The knurled head 52 of the rod 51 is then turned to rotate the motor shaft 7 in the direction opposite to the direction of its normal rotation, the cutter 15 being held firmly against rotation at the same time. The lugs 14 upon the cutter spindle 12 are drawn out of engagement with the hooked fingers 16 upon the cutter 15; and said cutter may be slipped from the pin 11. To secure the cutter 15 to the cutter spindle 12, the same manipulations are performed in reverse order.

It is desirable that the cloth should engage the cutter some distance above the lower edge of the cutter. In order that the place where the cloth engages the cutter may be maintained the same distance above the lower edge thereof as said cutter wears smaller, the adjustable throat plate 22 is provided. As the throat plate 22 is adjusted toward the cutter 15, it is also raised a corresponding distance, since it slides on the upwardly inclined portion 21 of the foot plate 1. The lugs 24 of the throat plate 22 engage in the guide slot 19 and keep the slot 23 in said throat plate in line with the edge of the cutter 15. The screw 25 holds the throat plate 22 in its adjusted positions, as is apparent.

Oil is fed to the lower bearing of the motor shaft 7 through the passage 49 from the felt contained in the hollow of the shank 45. This felt is kept saturated with oil by supplying oil to it through the hole 47 in the shank 45. The hole 47 is exposed by turning the loose sleeve 48 until the hole therein alines with said hole 47; and the hole 47 is covered by turning the loose sleeve 48 into the position where the hole therein does not aline with the hole 47. Oil is fed to the upper bearing of the motor shaft 7 from the felt in the recess 53 through the hole in the inner wall of the upper bearing. The recess 53 is normally covered by the knurled head 52 on the rod 51, which may be removed to give access to said recess 53.

The construction shown and described may be considerably modified without departing from my invention, and I do not wish, therefore, to be limited to the details of the construction shown and described.

What I claim is:

1. A cloth cutting machine comprising a cutter mounted upon a foot plate, said foot plate having a portion in front of said cutter which inclines upwardly toward said cutter, said inclined portion being above the portions of said foot plate surrounding it and having a guide slot therein, a throat plate having a slot in one end portion thereof and two lugs integral therewith, said throat plate being slidably mounted on said inclined portion with said lugs in said guide slot, and a screw passed through said guide slot from the bottom of said foot plate and screw-threaded into said throat plate.

2. A cloth cutting machine comprising a foot plate, a standard secured to said foot plate, a cutter rotatably mounted on standard, two spaced arms, flat springs connecting the corresponding ends of said arms to said standard, a grinding wheel rotatably mounted on the free end of each of said arms, said grinding wheels being located on opposite sides of said cutter, and adjustable means connected to said arms for limiting the downward movement of said arms and said grinding wheels.

3. A cloth cutting machine comprising a foot plate, a standard secured to said foot plate, a cutter spindle rotatably mounted on said standard, said cutter spindle having lugs extending radially therefrom at the outer end thereof, a circular cutter having hooked fingers engaging said lugs, said lugs and said hooked fingers preventing rotation of said cutter relative to said cutter spindle in one direction and permitting such rotation in the opposite direction.

4. A cutter for cloth cutting machines comprising a disk having its edge sharpened, said disk having hooked fingers integral therewith, said fingers being spaced apart in the circumference of a circle having the center of said disk as its center, and pointing in the same direction along said circle.

5. A cloth cutting machine comprising a foot plate, a standard secured to said foot plate, a cutter spindle rotatably mounted on said standard, said cutter spindle having lugs extending radially therefrom at the outer end thereof, a circular cutter rotatably mounted on said standard and having hooked fingers engaging said lugs, said lugs and said fingers preventing rotation of said cutter relative to said cutter spindle in one direction and preventing such rotation in the opposite direction, a rotary shaft mounted on said standard and operatively connected to said cutter spindle, and means connected to said shaft and adapted to be operated manually to turn said shaft.

6. A cloth cutting machine comprising a foot plate, a standard secured to said foot plate, a cutter rotatably mounted on said standard, an arm pivotally supported by said standard and having a guard at its end, said guard being in front of the edge of said cutter, and means for holding said arm in different positions relative to said standard.

7. A cloth cutting machine comprising a foot plate, a standard secured to said foot plate, a cutter, a cutter spindle rotatably mounted on said standard, said cutter and said spindle each having projections coöperating to secure said cutter to said spindle, said coöperating projections being arranged for interlocking and disengagement by a rotary movement of said cutter relative to said spindle.

8. A cloth cutting machine comprising a foot plate, a standard secured to said foot plate, a bearing secured to said standard and adapted to support the shaft of the motor of the cutting machine, and a handle having a hollow shank, said shank being secured to said standard and having a hole therein in communication with the bore of said bearing, said shank having the hollow therein filled with a material capable of absorbing oil.

Signed at St. Louis, Missouri, this 5th day of June, 1914.

JOHN B. GURY.

Witnesses:
NEIL D. PRESTON,
MARTHA A. SHELTON.

Copies of this patent may be obtained for five cents each, by addressing the "Commissioner of Patents, Washington, D. C."